(12) United States Patent
Liao et al.

(10) Patent No.: US 9,932,452 B2
(45) Date of Patent: Apr. 3, 2018

(54) RELEASE FILM AND PROCESS FOR PRODUCING THE SAME

(71) Applicant: NAN YA PLASTICS CORPORATION, Taipei (TW)

(72) Inventors: Te-Chao Liao, Taipei (TW); Sen-Huang Hsu, Taipei (TW); Chao-Quan Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 136 days.

(21) Appl. No.: 15/218,390

(22) Filed: Jul. 25, 2016

(65) Prior Publication Data

US 2017/0037210 A1    Feb. 9, 2017

(30) Foreign Application Priority Data

Aug. 5, 2015   (TW) .............................. 104125385 A (51) Int. Cl.
| | |
|---|---|
| C08J 7/04 | (2006.01) |
| C09D 183/04 | (2006.01) |
| C04B 35/622 | (2006.01) |
| B05D 5/08 | (2006.01) |
| B05D 7/04 | (2006.01) |

(52) U.S. Cl.
CPC .......... *C08J 7/047* (2013.01); *C04B 35/62218* (2013.01); *C09D 183/04* (2013.01); *B05D 5/08* (2013.01); *B05D 7/04* (2013.01); *B05D 2602/00* (2013.01); *C04B 2235/6025* (2013.01); *C08J 2367/02* (2013.01); *C08J 2451/06* (2013.01); *C08J 2483/04* (2013.01)

(58) Field of Classification Search
CPC . C08J 7/04; C08J 7/047; C08J 2367/02; C08J 2483/04; C08J 2451/06; C09D 183/04; C04B 35/62218; C04B 2235/6025; B05D 7/04; B05D 2602/00; B05D 5/08

USPC .......... 428/327, 352; 427/387; 502/158, 262
See application file for complete search history.

(56) References Cited

U.S. PATENT DOCUMENTS

| | | | | |
|---|---|---|---|---|
| 7,579,130 | B2 * | 8/2009 | Kobayashi | B32B 7/06 430/125.3 |
| 8,089,593 | B2 * | 1/2012 | Haruta | C08K 5/10 349/117 |
| 8,314,186 | B2 * | 11/2012 | Fung | C08G 18/73 525/118 |
| 2005/0227859 | A1 * | 10/2005 | Nakabayashi | B01J 21/063 502/150 |
| 2006/0222814 | A1 * | 10/2006 | Takahashi | C08J 7/04 428/141 |
| 2007/0031650 | A1 * | 2/2007 | Kobayashi | B32B 7/06 428/323 |
| 2008/0284957 | A1 * | 11/2008 | Haruta | C08K 5/10 349/117 |
| 2010/0183814 | A1 * | 7/2010 | Rios | C09D 183/04 427/387 |
| 2011/0064958 | A1 * | 3/2011 | Hirose | C23C 14/10 428/446 |
| 2014/0171569 | A1 * | 6/2014 | Fung | C09D 5/20 524/310 |

* cited by examiner

*Primary Examiner* — Douglas J McGinty
(74) *Attorney, Agent, or Firm* — Bacon & Thomas, PLLC

(57) ABSTRACT

A release film is provided for supporting an ultrathin ceramic green sheet having a thickness of 0.5 to 1.0 μm, and the release film due to containing modified organic particles and an antistatic agent has a slippery releasing surface with a low friction coefficient and hence excellent coatability and releasing properties; resulted in that when the release film is rolled up, the rolled surfaces do not adhere to each other, and when the ultrathin ceramic green sheet is peeled off from the release film, the ultrathin ceramic green sheet due to a relatively small electrostatic force being generated is without breaking; so that the release film contributes to increasing the yield of ultrathin ceramic green sheet.

19 Claims, 2 Drawing Sheets

RELEASE FILM AND PROCESS FOR PRODUCING THE SAME

BACKGROUND OF THE INVENTION

1. Field of the Invention

The present invention relates to a release film, and more particularly to a release film for supporting an ultrathin ceramic green sheet having a thickness of 0.5 to 1.0 μm and a process for producing the same.

2. Description of Related Art

Figure 1:
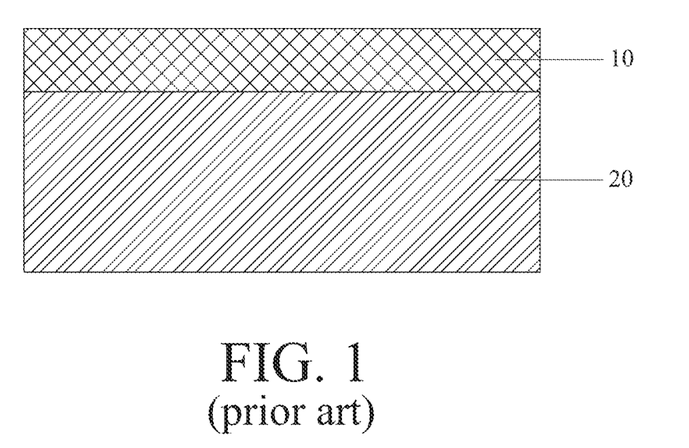
FIG. 1 schematically shows a conventional release film coated with a ceramic green sheet having a thickness of 1.0 to 5.0 µm.

A generally known ceramic green sheet 10, as shown in FIG. 1, is a ceramic lamination material widely used in association with multilayer technology, which is formed from ceramic slurry and covered over a release film 20 via a method of tape casting or doctor blade method.

Recently, thanks to advancements in ceramic film lamination techniques, the ceramic green sheet 10 has been made thinner and thinner, from 1.0-5.0 μm to merely 0.5-1.0 μm in thickness. And, as defined in field of ceramic green sheet, a ceramic green sheet with a thickness of 0.5 to 1.0 μm is hereinafter referred to as an ultrathin ceramic green sheet 10a.

Particularly, the ultrathin ceramic green sheet 10a can be used to make multilayer ceramic capacitors (MLCC) with a capacitance greater than 1 μF, which is a breakthrough in the art considering that the capacitance of a traditional MLCC ranges only from 0.1 to 1.0 μF.

However, the release film 20 of FIG. 1 conventionally used to support a ceramic green sheet 10 having a thickness greater than 1.0 μm is unsuitable for supporting the ultrathin ceramic green sheet 10a. This is because the conventional release film 20, as disclosed in US2006/0222814A1, tends to attach or adhere so firmly to the ultrathin ceramic green sheet 10a, so that a relatively great electrostatic force is generated between them when the ultrathin ceramic green sheet 10a is peeled off the release film 20, and the ultrathin ceramic green sheet 10a may break due to the electrostatic force if not peeled off properly.

In order for the release film 20 to better support and release the ultrathin ceramic green sheet 10a having a thickness of 0.5 to 1.0 μm, the release film 20 must provide a releasing surface with a better flatness and provide a film thickness with a better uniformity as well as provide a releasing force more stable, when compared with any counterparts in the prior art.

SUMMARY OF THE PRESENT INVENTION

In light of the above, it is an object of the invention to provide a release film for use in supporting an ultrathin ceramic green sheet having a thickness of 0.5 to 1.0 μm, and particularly, the release film is capable of reducing an electrostatic force when generated if peeled off the ultrathin ceramic green sheet from the release film, resulted in that the ultrathin ceramic green sheet is allowed to be easily peeled off the release film without breaking. The release film of the invention therefore helps improve the yield of ultrathin ceramic green sheets.

It is another object of the invention to provide a release film constituted by a thin film substrate, made of a polyester film, and a releasing-agent coating coated on one side or both sides of the thin film substrate, wherein the releasing-agent coating has a thickness of 0.04 to 0.8 μm and is formed from a coating liquid composition being heat-cured by exposure to a heat-curing temperature of 50-180° C. for at least 5 seconds; and, which coating liquid composition includes the following ingredients a)-e), whose respective percentages by weight are based on the total weight of the releasing-agent coating and add up to 100 wt %:

a) a silicone resin, at 0.5-7.0 wt %;
b) a platinum catalyst, at 0.06-0.3 wt %;
c) a mixed solvent containing methyl ethyl ketone (MEK), toluene and xylene, at 90.9-99.4 wt %; wherein the mixing ratio between MEK, toluene, and xylene is 50 (MEK):40 (toluene):10 (xylene);
d) modified organic particles, at 0.02-0.8 wt %; which are obtained from polystyrene (PS) particles or/and polymethylmethacrylate (PMMA) particles having been modified by grafting a bicycle[2,2,1]heptane-containing propylene as well as having an average particle size ($D_{50}$) ranging from 20 to 120 nm; and
e) an antistatic agent, at 0.02-1.0 wt %; which is one selected from an electrically conductive carbon material, an ionic-liquid antistatic agent or an electrically conductive polymeric antistatic agent.

It is another object of the invention to provide a release film incorporated with modified organic particles and an antistatic agent, of which releasing surface is rendered slippery, low in friction coefficient, and excellent in terms of coatability and releasing properties. When rolled up, the released film of the present invention does not adhere to itself.

It is still another object of the invention to provide a process for producing release film, comprising the following steps of:

1) preparing a coating liquid, based on the total weight of the coating liquid, comprising:
   a) having ready a silicone resin, at 0.5-7.0 wt %;
   b) pouring a mixed solvent containing methyl ethyl ketone (MEK), toluene and xylene, at 90.9-99.4 wt %, to well mix with the silicone resin; wherein the mixing ratio between MEK, toluene, and xylene is 50 (MEK):40 (toluene):10 (xylene);
   c) adding in a platinum catalyst, at 0.06-0.3 wt %, and stirring for 15 minutes;
   d. adding in modified organic particles at 0.02-0.8 wt %, preferably at 0.02-0.3 wt %, and stirring for 15 minutes; wherein the modified organic particles are modified polystyrene (PS) particles or/and polymethylmethacrylate (PMMA) particles due to modified by grafting a bicycle[2,2,1]heptane-containing propylene; and
   e. adding in an antistatic agent at 0.02-1.0 wt %, and stirring until well mixed; wherein the antistatic agent is one selected from an electrically conductive carbon material, an ionic-liquid antistatic agent or an electrically conductive polymeric antistatic agent;
2) coating one side or both sides of a polyester film with the preformed coating liquid of step 1): and
3) performing a heat-curing process on the coated polyester film obtained from step 2), at 50-180° C. for at least 5 seconds, preferably at 80-130° C. for 10-30 seconds; once the heat-curing reaction is completed, the release film is obtained.

In a preferred embodiment of the invention, an electrically conductive carbon material, which is in the form of modified carbon nanotubes (CNTs) and having the following chemical structure, is used:

where x is an integer greater than zero.

In a preferred embodiment of the invention, the ionic-liquid antistatic agent may be one or more selected from an imidazolium-based ionic liquid, a pyridinium-based ionic liquid or a phosphonium-based ionic liquid.

In a preferred embodiment of the invention, the electrically conductive polymeric antistatic agent is an electrically conductive polyaniline or an electrically conductive polythiophene.

DETAILED DESCRIPTION OF THE INVENTION

Figure 2:
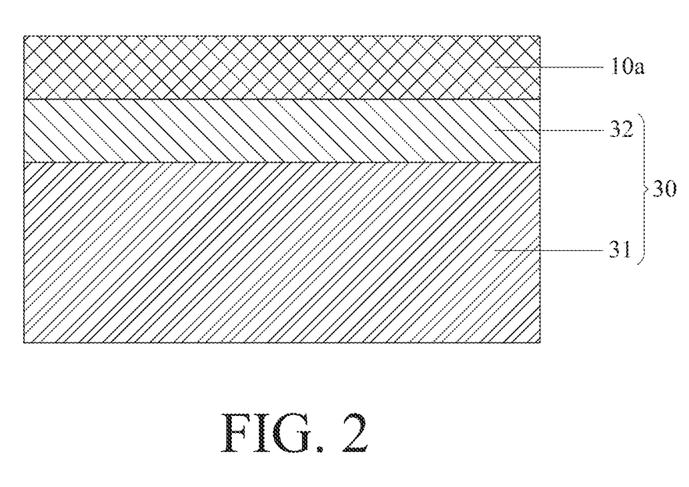
FIG. 2 schematically shows a release film of the present invention coated with an ultrathin ceramic green sheet having a thickness of 0.5 to 1.0 µm.

Referring to FIG. 2, a release film 30 of the present invention includes a thin film substrate 31 made of a polyester film and a releasing-agent coating 32 provided with an excellent releasing property and coated on one side or both sides of the thin film substrate 31. In particular, when the release film 30 is rolled up, its rolled surfaces are not prone to adhering to each other.

The release film 30 of the present invention is so suited to use to support an ultrathin ceramic green sheet 10a having a thickness of 0.5 to 1.0 µm, when peeled off the ultrathin ceramic green sheet 10a from the release film 30, the release film 30 allows the ultrathin ceramic green sheet 10a to stay intact without breaking.

The releasing-agent coating 32 is made not from an additive composition, but from a reactive composition. The process for producing the releasing-agent coating 32 of the invention includes:
a) a coating liquid is prepared from the reactive composition (hereinafter abbreviated as coating liquid composition);
b) a layer of the coating liquid of step a) is coated on one side or both sides of the thin film substrate 31 by a well-known coating method such as reverse roll coating, gravure coating or air-knife coating; and
c) finally the layer of the coating liquid of step b) is subjected to a drying/curing process to form the releasing-agent coating 32.

When coated on the thin film substrate 31 but not yet dried and cured, the releasing-agent coating 32, or more specifically the coating liquid, has a coating thickness ranging from 1 to 25 µm, preferably from 2 to 20 µm. Once the coating liquid is cured by heating, the coating thickness ranges from 0.04 to 0.8 µm, preferably from 0.06 to 0.3 µm.

If the coating thickness of the releasing-agent coating 32 is less than 0.01 µm after completion of the heat-curing process, the releasing properties of the release film 30 may be compromised, but if the coating thickness is greater than 0.8 µm, the releasing-agent coating 32 tends to cure insufficiently such that the releasing properties of the release film 30 are instable, i.e., may vary with time.

The releasing-agent coating 32 is intended to provide excellent releasing properties and may be added with a release control agent in order for the release film 30 to have preferable or even better releasing properties.

The coating liquid composition of the releasing-agent coating 32 includes the following ingredients a)-e), whose respective percentages by weight are based on the total weight of the releasing-agent coating 32 and add up to 100 wt %:
a) a silicone resin, at 0.5-7.0 wt %;
b) a platinum catalyst, at 0.06-0.3 wt %;
c) a mixed solvent containing methyl ethyl ketone (MEK)/toluene/xylene, at 90.9-99.4 wt %, wherein the mixing ratio between MEK, toluene, and xylene is 50 (MEK):40 (toluene):10 (xylene);
d) modified organic particles, at 0.02-0.8 wt %; and
e) an antistatic agent, at 0.02-1.0 wt %.

The silicone resin is a thermosetting silicone resin, or a mixture of thermosetting silicone resins, selected from silicone resins that involve a condensation reaction, an addition reaction, a UV curing process, or an electronic-beam curing process. Preferably, an addition reaction-based silicone resin is used.

The silicone resin may be selected from an acrylic-grafted silicone resin, an epoxy-grafted silicone resin, and a polydimethylsiloxane-based silicone resin. Preferably, a polydimethylsiloxane-based silicone resin, which features better releasing properties and higher heat resistance, is used.

In order to be transformed into a cured film, the silicone resin is heat-cured by exposure to a heat-curing temperature of 50-180° C. for at least 5 seconds, preferably to a heat-curing temperature of 80-130° C. for 10-30 seconds.

The silicone resin may have the structure of either or both of structural formulae (I) and (II) as follows:

where g, h, m, and n are integers greater than zero; and each of A, B, and C is —CH—CH$_2$, —C$_4$H$_8$CH—CH$_2$, —C$_3$H$_5$(CH$_3$)CH—CH$_2$, or —[CH(CH$_3$)]$_2$CH—CH$_2$.

The polydimethylsiloxane-based silicone resin may be selected from a polydimethylsiloxane-based silicone resin grafted with a vinyl group at a terminal end, a polydimethylsiloxane-based silicone resin grafted with a vinyl group at a terminal end and at an intermediate site, a polydimethylsiloxane-based silicone resin grafted with a hexyl group at a terminal end, and a polydimethylsiloxane-based silicone resin grafted with a hexyl group at a terminal end and at an intermediate site. Preferably, a polydimethylsiloxane-based silicone resin grafted with a hexyl group at a terminal end and at an intermediate site is used, for this silicone resin will have a grafting reaction with the modified organic particles in the present invention to better release the ultrathin green ceramic sheet 10a supported on the release film 30.

Commercially available polydimethylsiloxane-based silicone resins include those supplied by Shin Etsu of Japan under the trade names KS-774, KS-778, KS-847T, KS-3705, and X-62-2112 resins; those supplied by Dow Corning of USA under the trade names 7362, 7367, LTC-885, and LTC-750A resins; those supplied by Wacker of Germany under the trade names D944 and D955 resins; and that supplied by Toshiba under the trade name 6700N resin.

The platinum catalyst serves mainly to promote the curing reaction of the silicone resin. A proper curing reaction turns the silicone resin into a cured film, on the contrary, while an improper curing reaction does not.

The present invention uses the platinum catalyst rather than a tin catalyst because the latter causes pollution and has a lower reaction rate. Platinum catalysts, on the other hand, are more environmentally friendly and have higher reaction rates.

Commonly used inorganic particles are poorly compatible with silicone resins. In fact, unmodified inorganic particles tend to coagulate on a silicone resin-containing release film, forming localized lumps on the film surface, which is undesirable.

The modified organic particles of the present invention include vinyl groups on their surface. During the process for producing the releasing-agent coating 32, therefore, a grafting reaction takes place between the vinyl groups of the modified organic particles and of the silicone resin such that the modified organic particles do not coagulate but form appropriately sized and slippery organic particles through the grafting reaction.

Figure 3:
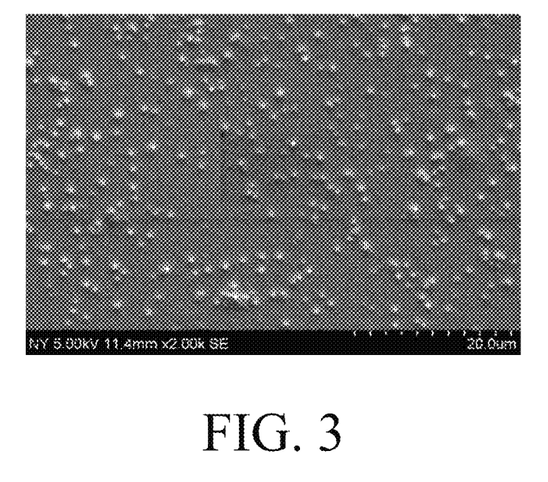
FIG. 3 is a scanning electron microscope (SEM) image showing the surface structure of the release film of FIG. 2.

The surface configuration of the release film 30 containing the modified organic particles was observed with a scanning electron microscope (SEM, Hitachi 2600S) to produce the SEM image in FIG. 3 for structural analysis. According to FIG. 3, the releasing-agent coating 32 of the release film 30 of the present invention has a grainy surface attributable to the modified organic particles. Thus, by incorporating the modified organic particles into the releasing-agent coating 32 of the release film 30 of the present invention, the releasing-agent coating 32 is effectively enhanced in surface slipperiness.

The modified organic particles are obtained from polystyrene (PS) particles or polymethylmethacrylate (PMMA) particles having been modified by grafting a bicycle[2,2,1] heptane-containing propylene, both of which have relatively high resistance to heat.

Once grafted with a bicycle[2,2,1]heptane-containing propylene, the modified polystyrene (PS) particles are hereinafter referred to as "modified PS balls", and the modified polymethylmethacrylate (PMMA) particles are hereinafter referred to as "modified PMMA balls".

The modified PS balls have the following chemical structure:

where p is an integer greater than zero.

The modified PMMA balls have the following chemical structure:

where q is an integer greater than zero.

The modified organic particles (i.e., the modified PS balls or the modified PMMA balls) have an average particle size ($D_{50}$) ranging from 20 to 280 nm, preferably from 20 to 120 nm.

If the average particle size ($D_{50}$) of the modified organic particles is greater than 280 nm, the superficial ones of the modified organic particles may fall off easily, and an undesirably high surface roughness can be expected.

If the average particle size ($D_{50}$) of the modified organic particles is less than 20 nm, most of the modified organic particles will precipitate and therefore stay inside the silicone resin coating; in other words, the modified organic particles will not form a grainy surface on the releasing-agent coating 32. Should this happen, the surface of the releasing-agent coating 32 will have a relatively high coefficient of friction such that the release film 30 is subject to abrasion during manufacture.

The modified organic particles are added into the releasing-agent coating 32 in an amount ranging from 0.02 to 0.8 wt %, preferably from 0.02 to 0.5 wt %, more preferably from 0.02 to 0.3 wt %.

The modified organic particles are added into the release film 30 of the present invention to form a slippery (i.e., low-roughness) as well as grainy surface as the releasing surface of the release film 30. Therefore, even when the release film 30 is rolled up, the slippery as well as grainy releasing surface prevents adhesion between the rolled surfaces.

Referring to FIG. 2, the antistatic agent is added into the releasing-agent coating 32 of the release film 30 of the present invention to reduce the electrostatic force generated between the release film 30 and the ultrathin ceramic green sheet 10a supported thereon when peeled off the latter from the former. When the release film 30 is rolled up, the antistatic agent also helps prevent the rolled surfaces from adhering to each other.

The antistatic agent may be selected from an electrically conductive carbon material, an ionic-liquid antistatic agent, and an electrically conductive polymeric antistatic agent, and is added in an amount ranging from 0.02 to 1.0 wt %, preferably from 0.05 to 0.8 wt %, more preferably from 0.1 to 0.5 wt %.

The electrically conductive carbon material is preferably modified carbon nanotubes (CNTs) added in an amount ranging from 0.1 to 0.5 wt %. The modified carbon nanotubes (CNTs) have the following chemical structure:

where x is an integer greater than zero.

When the modified carbon nanotubes are in the form of fibrous powder, the fibrous powder should have a diameter of 2-10 nm, preferably 5-10 nm, and a length of 1-20 μm, with a length-to-diameter ratio greater than 100. The fibrous powder tends to coagulate and hence disperse poorly when its diameter is less than 2 nm. If the diameter of the fibrous powder is greater than 10 nm, the releasing-agent coating 32 of the release film 30 of the present invention will have an uneven surface, and the ultrathin green ceramic sheet 10a supported on the release film 30 may break when peeled off.

The ionic-liquid antistatic agent may be one or more selected from an imidazolium-based ionic liquid, a pyridinium-based ionic liquid or a phosphonium-based ionic liquid.

When added with an imidazolium-based ionic liquid, the release film 30 of the present invention is not only antistatic but also enhanced in its releasing properties, it is meant that the imidazolium-based ionic liquid helps prevent ultrathin green ceramic sheet 10a supported on the release film 30 from breaking when peeled off. The imidazolium-based ionic liquid is preferably a 1-ethyl-3-methylimidazolium (EMI)-based ionic liquid, which features heat stability and high ionic conductivity.

Commercially available pyridinium-based ionic liquids include those supplied by Koei of Japan under the trade names P14 and IL-P18.

Commercially available phosphonium-based ionic liquids include those supplied by Koei of Japan under the trade names IL-AP1 and IL-AP3.

The ionic-liquid antistatic agent may be used in combination with different anionic antistatic agents selectively. For example, an imidazolium-based ionic liquid can be used together with an acetate-based ionic liquid to make the release film 30 of the present invention even more antistatic.

The electrically conductive polymeric antistatic agent may be selected from polyaniline, which is electrically conductive, and an electrically conductive polythiophene. Commercially available products include those supplied by Carlit of Japan under the trade names PEL-20A, PEL-20BBL, PEL-25, and PEL-100 electrically conductive polymeric antistatic agents.

The present invention also provides a process for producing the release film 30, according to an applicable selection of the aforementioned ingredients, wherein the process includes the steps of:
1) Preparing a coating liquid for forming the releasing-agent coating 32:
 a. Have ready the silicone resin at 0.5-7 wt %;
 b. Add in the mixed solvent containing MEK/toluene/xylene at 90.9-99.4 wt %, wherein the mixing ratio between MEK, toluene, and xylene is 50 (MEK):40 (toluene):10 (xylene);
 c. Add in the platinum catalyst at 0.06-0.3 wt %, and stir for 15 minutes;
 d. Add in the modified organic particles at 0.02-0.8 wt %, and stir for 15 minutes; and
 e. Add in the antistatic agent at 0.02-1.0 wt %, and stir until well mixed;
2) Coating one side or both sides of a polyester film with the coating liquid of step 1):
 Apply the coating liquid prepared in step 1) to one side or both sides of the polyester film while the polyester film is fed continuously into a coating machine;
3) Performing a heat-curing process on the coated polyester film obtained from step 2), wherein the heat-curing process is performed at 80-130° C. for 10-30 seconds such that, once the heat-curing reaction is completed, the release film 30 of the present invention is formed; and
4) Rolling up the release film obtained from step 3).

During the manufacturing process described above, the release film 30 stays flat and does not wrinkle at the heat-curing temperature of 80-130° C. Once the release film 30 is completed, the releasing surface of the releasing-agent coating 32 is grainy and slippery and therefore has good coatability and releasing properties. When the release film 30 is rolled up, the rolled surfaces do not adhere to each other. When supporting the ultrathin ceramic green sheet 10a as shown in FIG. 2, the release film 30 allows the ultrathin ceramic green sheet 10a to be peeled off easily without breaking.

The features and advantages of the present invention are further demonstrated by the following examples and comparative examples, all of which examples are not intended to be restrictive of the scope of the invention.

<Preparing a Coating Liquid A for Forming the Releasing-Agent Coating 32>

A mixed solvent W was prepared from MEK, toluene, and xylene in a ratio of 50 (MEK):40 (toluene):10 (xylene). 4480 g (97.57 wt %) of solvent W was added into 320 g (2 wt %) of KS-847T resin (supplied by Shin Etsu of Japan) and stirred well. 6.4 g (0.13 wt %) of platinum catalyst CAT-PL-50T (supplied by Shin Etsu of Japan) was subsequently added and stirred for 15 minutes to form a reaction solution. 4.8 g (0.1 wt %) of modified PS balls was added into the reaction solution and stirred for 15 minutes, and then 9.6 g (0.2 wt %) of modified CNT antistatic agent was added and stirred well to produce a silicone resin-containing coating liquid A with 2.0% solid content.

<Determining the Physical Properties of the Release Film>

1. Average particle size (d) of inert particles
 Particle size analyzer LB-500 of HORIBA was used to determine the average particle sizes ($D_{50}$) of various particles.

2. Average surface roughness (SRa)
 Average surface roughness (SRa) was determined by the JIS-B0601 method, using probe-type surface roughness tester SURFCORDER ET-4000A of Kosaka Laboratory Ltd under the following test conditions:
 (a) Probe tip radius: 2 µm
 (b) Test length: 1.0 mm
 (c) Test width: 0.25 mm 3. ten-point average surface roughness (SRz)
 Probe-type surface roughness tester SURFCORDER ET-4000A was used for determining ten-point average surface roughness (SRz), which is the difference between the average of the 5 greatest heights and the average of the 5 lowest heights.

4. Impedance of the releasing surface
 A surface impedance meter (ULTRA-HIGH RESISTANCE METER R8340A) of ADVANTEST was used for determining the impedance.

5. Adhesion between the rolled surfaces of the release film
 A 2000-m length of release film was rolled up and subjected to a one month aging test at 60° C. Whether the releasing surface and the backside of the release film adhered to each other was determined by visual inspection and recorded as follows:
 1. no adhesion;
 2. slight adhesion; or
 3. significant adhesion.

6. Producibility of ceramic green sheets
 An ultrathin ceramic green sheet having a thickness of 0.5 to 1.0 µm was coated on the release film and inspected for breakage. The test results were recorded as follows:
 1. "always broke", indicating very low producibility for the ultrathin ceramic green sheet;
 2. "broke occasionally", indicating low producibility for the ultrathin ceramic green sheet; or
 3. "never broke", indicating high producibility for the ultrathin ceramic green sheet.

7. Electrostatic force generated by peeling off the ceramic green sheet from the release film To measure the electrostatic force, the ceramic green sheet supported on the release film was cut into 200 mm×200 mm pieces; a sucker was used to peel off, or more specifically suck, the ceramic green sheet pieces from the release film; and the electrostatic force generated by the peeling operation was measured with an electrometer (SV-10) of Kasuga Denki Inc.

EXAMPLE 1

A thin film substrate having a thickness of 30 μm and made of polyethylene terephthalate (PET) film was used and coated with the pre-prepared coating liquid A in an amount of 8 g/m² by a wet coating method using a bar coater. The coated PET substrate was subjected to a 130° C. heat-curing process for 30 seconds to produce a release film, which was subsequently rolled up.

The physical properties of the release film were determined and are shown in Table 1.

EXAMPLE 2

A release film was made in the same way as in example 1 except that the modified PS balls having a particle size of 120 nm being used in example 1 were replaced by modified PMMA balls having a particle size of 80 nm.

The physical properties of the release film were determined and are shown in Table 1.

EXAMPLE 3

A release film was made in the same way as in example 1 except that the modified CNT antistatic agent in example 1 was replaced by the EMI ionic-liquid antistatic agent.

The physical properties of the release film were determined and are shown in Table 1.

EXAMPLE 4

A release film was made in the same way as in example 2 except that the modified CNT antistatic agent in example 2 was replaced by the EMI ionic-liquid antistatic agent.

The physical properties of the release film were determined and are shown in Table 1.

EXAMPLE 5

A release film was made in the same way as in example 3 except that the amount of the antistatic agent used was changed from 0.2 wt % in example 3 to 0.3 wt %.

The physical properties of the release film were determined and are shown in Table 1.

EXAMPLE 6

A release film was made in the same way as in example 4 except that the amount of the antistatic agent used was changed from 0.2 wt % in example 4 to 0.3 wt %.

The physical properties of the release film were determined and are shown in Table 1.

COMPARATIVE EXAMPLE 1

A release film was made in the same way as in example 1 except that a polyethylene naphthalate (PEN) substrate was used in place of the PET substrate, that modified PS balls with the particle size of 290 nm were substituted for the modified PS balls with the particle size of 120 nm and were used in a smaller amount of 0.01 wt %, and that the EMI ionic-liquid antistatic agent was substituted for the modified CNT antistatic agent and was used in a smaller amount of 0.01 wt %.

The physical properties of the release film were determined and are shown in Table 2.

COMPARATIVE EXAMPLE 2

A release film was made in the same way as in comparative example 1 except that the modified PS balls with the particle size of 290 nm were replaced by modified PMMA balls with the particle size of 20 nm.

The physical properties of the release film were determined and are shown in Table 2.

COMPARATIVE EXAMPLE 3

A release film was made in the same way as in comparative example 1 except that modified PS balls with the particle size of 800 nm were substituted for the modified PS balls with the particle size of 290 nm and were used in a greater amount of 0.9 wt %, and that the amount of the EMI ionic-liquid antistatic agent used was increased to 1.2 wt %.

The physical properties of the release film were determined and are shown in Table 2.

COMPARATIVE EXAMPLE 4

A release film was made in the same way as in comparative example 3 except that a polylactic acid film was used in place of the 30 μm-thick PEN substrate, that a 100° C. heat-curing process was performed on the coated polylactic acid film for 30 seconds, that 40-nm SiO2 particles were substituted for the modified PS balls with the particle size of 800 nm, and that the IL-AP1 antistatic agent was substituted for the EMI antistatic agent and was used in a greater amount of 1.2 wt %.

The physical properties of the release film were determined and are shown in Table 2.

COMPARATIVE EXAMPLE 5

A release film was made in the same way as in comparative example 4 except that 2000-nm silicone particles were substituted for the 40-nm SiO2 particles and were used in a smaller amount of 0.01 wt %, and that the IL-AP3 antistatic agent replaced the IL-AP1 antistatic agent.

The physical properties of the release film were determined and are shown in Table 2.

COMPARATIVE EXAMPLE 6

A release film was made in the same way as in comparative example 5 except that the silicone particles were used in a greater amount of 0.9 wt %, and that polyaniline, which is electrically conductive, was substituted for the IL-AP3 antistatic agent and was used in a smaller amount of 0.01 wt %.

The physical properties of the release film were determined and are shown in Table 2.

TABLE 1

| | | Example | | | | | |
|---|---|---|---|---|---|---|---|
| | | 1 | 2 | 3 | 4 | 5 | 6 |
| Thin film substrate | | PET film | | | | | |
| Modified organic particles | species | PS | PMMA | PS | PMMA | PS | PMMA |
| | added amount (wt %) | 0.1 | 0.1 | 0.1 | 0.1 | 0.1 | 0.1 |
| | average particle size (nm) | 120 | 80 | 120 | 80 | 120 | 80 |
| Antistatic agent | species | Modified CNT | | EMI | EMI | EMI | EMI |
| | added amount (wt %) | 0.2 | 0.2 | 0.2 | 0.2 | 0.3 | 0.3 |
| Three-dimensional center-line average roughness of releasing surface (SRa μm) | | 0.012 | 0.011 | 0.012 | 0.011 | 0.012 | 0.011 |
| Three-dimensional 10-point average roughness of releasing surface (SRz μm) | | 0.320 | 0.266 | 0.332 | 0.273 | 0.334 | 0.281 |
| Impedance of peeling surface ($\Omega/\square$) | | $10^{12}$ | $10^{12}$ | $10^{12}$ | $10^{12}$ | $10^{11}$ | $10^{11}$ |
| Adhesion between rolled surfaces of the release film when rolled up for storage | | no adhesion | | | slight adhesion | | |
| Thickness of ceramic green sheet | | 1 μm | 1 μm | 1 μm | 1 μm | 1 μm | 1 μm |
| Producibility of ceramic green sheets | | never broke | | | broke occasionally | | |
| Electrostatic force produced by peeling ceramic green sheet from release film | | 0.8 KV | 1.5 KV | 1 KV | 1.6 KV | 1.1 KV | 1.2 KV |

TABLE 2

| | | Comparative Example | | | | | |
|---|---|---|---|---|---|---|---|
| | | 1 | 2 | 3 | 4 | 5 | 6 |
| Thin film substrate | | PEN film | | | | Polylactic acid film | |
| Modified organic particles | species | PS | PMMA | PS | SiO$_2$ | Silicone | Silicone |
| | added amount (wt %) | 0.01 | 0.01 | 0.9 | 0.9 | 0.01 | 0.9 |
| | average particle size (nm) | 290 | 20 | 800 | 40 | 2000 | 2000 |
| Antistatic agent | species | EMI | EMI | EMI | IL-AP1[1] | IL-AP3[1] | Poly-aniline |
| | added amount (wt %) | 0.01 | 0.01 | 1.2 | 1.2 | 1.2 | 0.01 |
| Three-dimensional center-line average roughness of releasing surface (SRa μm) | | 0.016 | 0.013 | 0.025 | 0.024 | 0.031 | 0.037 |
| Three-dimensional 10-point average roughness of releasing surface (SRz μm) | | 0.412 | 0.395 | 0.542 | 0.536 | 0.823 | 0.965 |
| Impedance of peeling surface ($\Omega/\square$) | | $10^{13}$ | $10^{13}$ | $10^{12}$ | $10^{12}$ | $10^{12}$ | $10^{13}$ |
| Adhesion between rolled surfaces of the release film when rolled up for storage | | | | significant adhesion | | | |
| Thickness of ceramic green sheet | | 1 μm | 1 μm | 1 μm | 1 μm | 1 μm | 1 μm |
| Producibility of ceramic green sheets | | | | always broke | | | |
| Electrostatic force produced by peeling ceramic green sheet from release film | | 10 KV | 12 KV | 2 KV | 2 KV | 2 KV | 10.2 KV |

Note:
[1] IL-AP1 are IL-AP3 are phosphonium-based ionic liquids supplied by Koei Chemical Company Ltd.

Results and Discussion

1. The release films in examples 1-6, which contain 0.1 wt % modified PS balls (or modified PMMA balls) with an average particle sizes (D50) ranging from 80 to 120 nm and which also contain 0.2-0.3 wt % modified CNT antistatic agent (or EMI antistatic agent), stayed flat and did not wrinkle at the heat-curing temperature of 130° C. Moreover, the releasing surface (also referred to as peeling surface) of each release film was slippery, had a relatively low coefficient of friction, and featured outstanding coatability and releasing properties.

2. When the release films in examples 1-6 were rolled up, the rolled surfaces of each roll did not adhere to each other.

3. Each release film in examples 1-6 was successfully coated with 1 μm-thick ceramic green sheets, without pinholes or cracks in the ceramic green sheets.

4. The release films in examples 1-6 resulted in a relatively small electrostatic force between each release film and the ceramic green sheet supported thereon during the peeling process, and all the 1 μm-thick ceramic green sheets were easily peeled off without breaking, indicating that the release film of the present invention helps achieve a high yield of ceramic green sheets.

5. As to the release films in comparative examples 1-6, those using a PEN film or polylactic acid film substrate, or added with SiO2 or silicone organic particles, or containing more than 1 wt % antistatic agent failed to support or produce 1 μm-thick ceramic green sheets properly.

6. The release films in comparative examples 1, 3, 5, and 6 contain excessively large organic particles, whose sizes are equal to or greater than 290 nm and which therefore were unable to attach to and eventually fell off the releasing surfaces of those release films. As a result, the releasing (or peeling) surfaces of the release films in comparative examples 1, 3, 5, and 6 had relatively high coefficients of friction, and pinholes or cracks were found in the 1 μm-thick ceramic green sheets respectively coated thereon. This indicates that the release films in comparative examples 1, 3, 5, and 6 are unsuitable for supporting or producing 1 μm-thick ceramic green sheets.

7. The release films in comparative examples 1 and 4 contain less than 0.02 wt % or more than 1.0 wt % antistatic agent. Once these release films were rolled up, adhesion took place between the rolled surfaces of each roll, and the release films had uneven surfaces when subsequently unrolled. Also, the ceramic green sheets respectively coated on those release films had pinholes or cracks, and relatively high electrostatic forces were detected when the ceramic green sheets were peeled off. The release films in comparative examples 1 and 4 are therefore unsuitable for supporting or producing 1 μm-thick ceramic green sheets.

8. In comparative example 2, the release film contains modified PMMA balls whose particle size is as small as 20 nm and whose percentage by weight is less than 0.02 wt %. The overly small particle size and tiny amount of the modified PMMA balls contributed to a relatively high coefficient of friction of the releasing (or peeling) surface of the release film such that, once the release film was rolled up, the rolled surfaces adhered to each other, rendering the release film useless.

What is claimed is:

1. A release film constituted by a thin film substrate and a releasing-agent coating having a thickness of 0.04 to 0.8 μm and coated on one side or both sides of the thin film substrate, wherein the releasing-agent coating is formed from a coating liquid composition consisting of the following ingredients a)-e), whose respective percentages by weight are based on the total weight of the releasing-agent coating and add up to 100 wt %:
   a) a silicone resin, at 0.5-7.0 wt %;
   b) a platinum catalyst, at 0.06-0.3 wt %;
   c) a mixed solvent containing methyl ethyl ketone (MEK), toluene and xylene, at 90.9-99.4 wt %; wherein the mixing ratio between MEK, toluene, and xylene is 50 (MEK):40 (toluene):10 (xylene);
   d) modified organic particles, at 0.02-0.8 wt %; which are obtained from polystyrene (PS) particles or/and polymethylmethacrylate (PMMA) particles having been modified by grafting a bicycle[2,2,1]heptane-containing propylene; and
   e) an antistatic agent, at 0.02-1.0 wt %; which is one selected from an electrically conductive carbon material, an ionic-liquid antistatic agent or an electrically conductive polymeric antistatic agent.

2. The release film of claim 1, wherein the thin film substrate is made of a polyester film.

3. The release film of claim 1, wherein the silicone resin is one of or a combination of the structural formula (I) and (II) as follows:

where g, h, m, and n are integers greater than zero; and each of A, B, and C is —CH—CH$_2$; —C$_4$H$_8$CH—CH$_2$; —C$_3$H$_5$(CH$_3$)CH—CH$_2$; or —[CH(CH$_3$)]$_2$CH—CH$_2$.

4. The release film of claim 1, wherein the modified polystyrene (PS) particles have the following chemical structure:

where p is an integer greater than zero.

5. The release film of claim 1, wherein the polymethylmethacrylate (PMMA) particles have the following chemical structure:

where q is an integer greater than zero.

6. The release film of claim 1, wherein the modified polystyrene (PS) particles or the modified polymethylmethacrylate (PMMA) particles have an average particle size (D$_{50}$) ranging from 20 to 120 nm.

7. The release film of claim 1, wherein the modified organic particles added in an amount of 0.02-0.3 wt %.

8. The release film of claim 1, wherein the electrically conductive carbon material is a modified carbon nanotubes (CNTs) and having the following chemical structure:

where x is an integer greater than zero.

9. The release film of claim 1, wherein the ionic-liquid antistatic agent is one or more selected from an imidazolium-based ionic liquid, a pyridinium-based ionic liquid or a phosphonium-based ionic liquid.

10. The release film of claim 1, wherein the electrically conductive polymeric antistatic agent is an electrically conductive polyaniline or an electrically conductive polythiophene.

11. The release film of claim 1, further comprising an ultrathin ceramic green sheet which has a thickness of 0.5 to 1.0 μm and is supported on the releasing-agent coating of the release film.

12. A process for producing a release film constituted by a thin film substrate and a releasing-agent coating having a thickness of 0.04 to 0.8 μm and coated on one side or both sides of the thin film substrate, comprising the following steps of:
    a) preparing a coating liquid composition consisting of the following ingredients a1)-a5), based on a total weight of the coating liquid composition:
        a1) a silicone resin, at 0.5-7.0 wt %;
        a2) a platinum catalyst, at 0.06-0.3 wt %;
        a3) a mixed solvent containing methyl ethyl ketone (MEK)/toluene/xylene, at 90.9-99.4 wt %, wherein the mixing ratio between MEK, toluene, and xylene is 50 (MEK):40 (toluene):10 (xylene);
        a4) modified organic particles having an average particle size ($D_{50}$) ranging from 20 to 120 nm, and at 0.02-0.8 wt %, which are obtained from polystyrene (PS) particles or/and polymethylmethacrylate (PMMA) particles having been modified by grafting a bicycle[2,2,1]heptane-containing propylene; and
        a5) an antistatic agent, at 0.02-1.0 wt %, which is one selected from an electrically conductive carbon material, an ionic-liquid antistatic agent or an electrically conductive polymeric antistatic agent;
    b) coating one or two sides of the thin film substrate with the coating liquid composition of step a), by a coating machine; and
    c) performing a heat-curing process on the thin film substrate of step b) with a heat-curing temperature of 50-180° C. for at least 5 seconds, and then the release film is obtained.

13. The process for producing a release film of claim 12, wherein at step c) the heat-curing process is performed with a heat-curing temperature of 80-130° C. and a heating time of 10-30 seconds.

14. The process for producing a release film of claim 12, wherein the silicone resin is one of or a combination of the structural formula (I) and (II) as follows:

(I)

(II)

where g, h, m, and n are integers greater than zero; and each of A, B, and C is —CH—CH$_2$; —C$_4$H$_8$CH—CH$_2$; —C$_3$H$_5$(CH$_3$)CH—CH$_2$; or —[CH(CH$_3$)]$_2$CH—CH$_2$.

15. The process for producing a release film of claim 12, wherein the modified polystyrene (PS) particles have the following chemical structure:

where p is an integer greater than zero.

16. The process for producing a release film of claim 12, wherein the polymethylmethacrylate (PMMA) particles have the following chemical structure:

where q is an integer greater than zero.

17. The process for producing a release film of claim 12, wherein the electrically conductive carbon material is a modified carbon nanotubes (CNTs) and having the following chemical structure:

where x is an integer greater than zero.

18. The process for producing a release film of claim 12, wherein the ionic-liquid antistatic agent is one or more selected from an imidazolium-based ionic liquid, a pyridinium-based ionic liquid or a phosphonium-based ionic liquid.

19. The process for producing a release film of claim 12, wherein the electrically conductive polymeric antistatic agent is an electrically conductive polyaniline or an electrically conductive polythiophene.

* * * * *